(12) United States Patent
Liu et al.

(10) Patent No.: US 10,841,485 B2
(45) Date of Patent: Nov. 17, 2020

(54) PHOTOGRAPHING METHOD AND PHOTOGRAPHING APPARATUS FOR TERMINAL, AND TERMINAL

(71) Applicant: Huawei Technologies Co., Ltd., Shenzhen (CN)

(72) Inventors: Xun Liu, Shenzhen (CN); Lei Wu, Shanghai (CN); Cheng Du, Beijing (CN); Wei Luo, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/481,288

(22) PCT Filed: Feb. 24, 2017

(86) PCT No.: PCT/CN2017/074707
§ 371 (c)(1),
(2) Date: Jul. 26, 2019

(87) PCT Pub. No.: WO2018/137264
PCT Pub. Date: Aug. 2, 2018

(65) Prior Publication Data
US 2020/0177797 A1 Jun. 4, 2020

(30) Foreign Application Priority Data
Jan. 26, 2017 (CN) .......................... 2017 1 0061843

(51) Int. Cl.
*H04N 5/232* (2006.01)
*H04N 5/247* (2006.01)

(52) U.S. Cl.
CPC ..... *H04N 5/23219* (2013.01); *H04N 5/23296* (2013.01); *H04N 5/247* (2013.01)

(58) Field of Classification Search
CPC ........... H04N 5/23219; H04N 5/23296; H04N 5/247; H04N 5/217; H04N 5/2258; H04N 5/23293
See application file for complete search history.

(56) References Cited

U.S. PATENT DOCUMENTS

| 9,716,825 B1 * | 7/2017 | Manzari | H04N 13/271 |
| 10,200,599 B1 * | 2/2019 | Baldwin | H04N 5/2258 |

(Continued)

FOREIGN PATENT DOCUMENTS

| CN | 101453568 A | 6/2009 |
| CN | 101950550 A | 1/2011 |

(Continued)

OTHER PUBLICATIONS

Machine Translation and Abstract of Chinese Publication No. CN101950550, Jan. 19, 2011, 12 pages.

(Continued)

*Primary Examiner* — Padma Haliyur
(74) *Attorney, Agent, or Firm* — Conley Rose, P.C.

(57) ABSTRACT

A method includes obtaining a first preview picture collected by a camera, where an angle of view FOV of the camera is a first FOV value, the camera collects the first preview picture based on a second FOV value, and the second FOV value is less than the first FOV value. The method further includes adjusting the second FOV value to a third FOV value when it is detected that a quantity of at least one target human face in the first preview picture is greater than a first preset value, where the third FOV value is greater than the second FOV value, and the third FOV value is less than or equal to the first FOV value. The method further includes outputting an image that is photographed by the camera based on the third FOV value.

20 Claims, 5 Drawing Sheets

(56) References Cited

U.S. PATENT DOCUMENTS

| | | | |
|---|---|---|---|
| 10,200,623 B1* | 2/2019 | Baldwin | H04N 5/2258 |
| 10,616,549 B2* | 4/2020 | Park | H04N 13/111 |
| 10,635,920 B2* | 4/2020 | Ikegami | G06K 9/2081 |
| 2009/0141367 A1 | 6/2009 | Guan | |
| 2011/0128385 A1 | 6/2011 | Bedros et al. | |
| 2012/0057039 A1 | 3/2012 | Gardiner et al. | |
| 2014/0340543 A1* | 11/2014 | Nakada | H04N 9/09 |
| | | | 348/239 |
| 2015/0077549 A1 | 3/2015 | Wu | |
| 2016/0125246 A1 | 5/2016 | Ryhorchuk et al. | |
| 2016/0283781 A1* | 9/2016 | Kurakane | H04N 5/64 |
| 2019/0289201 A1* | 9/2019 | Nishimura | H04N 13/20 |

FOREIGN PATENT DOCUMENTS

| | | |
|---|---|---|
| CN | 104618642 A | 5/2015 |
| CN | 104994284 A | 10/2015 |
| CN | 104994292 A | 10/2015 |
| CN | 105049710 A | 11/2015 |
| CN | 105204603 A | 12/2015 |
| CN | 104461288 B | 11/2017 |

OTHER PUBLICATIONS

Machine Translation and Abstract of Chinese Publication No. CN104461288, Nov. 10, 2017, 16 pages.
Machine Translation and Abstract of Chinese Publication No. CN104994284, Oct. 21, 2015, 20 pages.
Machine Translation and Abstract of Chinese Publication No. CN104618642, May 13, 2015, 12 pages.
Machine Translation and Abstract of Chinese Publication No. CN104994292, Oct. 21, 2015, 21 pages.
Machine Translation and Abstract of Chinese Publication No. CN105049710, Nov. 11, 2015, 22 pages.
Machine Translation and Abstract of Chinese Publication No. CN105204603, Dec. 30, 2015, 18 pages.
Foreign Communication From a Counterpart Application, Chinese Application No. 201780009371.8, Chinese Office Action dated Jul. 24, 2019, 9 pages.
Foreign Communication From a Counterpart Application, PCT Application No. PCT/CN2017/074707, English Translation of International Search Report dated Sep. 11, 2017, 2 pages.
Foreign Communication From a Counterpart Application, PCT Application No. PCT/CN2017/074707, English Translation of Written Opinion dated Sep. 11, 2017, 5 pages.

* cited by examiner

200

```
┌─────────────────────────────────────────────────────┐
│ Obtain a first preview picture collected by a camera,│
│ where an angle of view FOV of the camera is a first  │
│ FOV value, the camera collects the first preview picture │ ~ S210
│ based on a second FOV value, and the second FOV     │
│ value is less than the first FOV value              │
└─────────────────────────────────────────────────────┘
                            │
┌─────────────────────────────────────────────────────┐
│ Adjust the second FOV value to a third FOV value when│
│ it is detected that a quantity of at least one target human│
│ face in the first preview picture is greater than a first │ ~ S220
│ preset value, where the third FOV value is greater than│
│ the second FOV value, and the third FOV value is less│
│ than or equal to the first FOV value                │
└─────────────────────────────────────────────────────┘
                            │
┌─────────────────────────────────────────────────────┐
│ Output an image that is photographed by the camera  │ ~ S230
│ based on the third FOV value                        │
└─────────────────────────────────────────────────────┘
```

Obtain a first preview picture collected by a first camera or a second camera, where an angle of view FOV of the first camera is a first FOV value, a FOV of the second camera is a second FOV value, the first FOV value is less than the second FOV value, the first preview picture is collected based on a third FOV value, and the third FOV value is less than the second FOV value ∿ S410

Adjust the third FOV value to a fourth FOV value when it is detected that a quantity of at least one target human face in the first preview picture is greater than a first preset value, where the fourth FOV value is greater than the third FOV value ∿ S420

Perform camera switching based on the fourth FOV value ∿ S430

FIG. 4

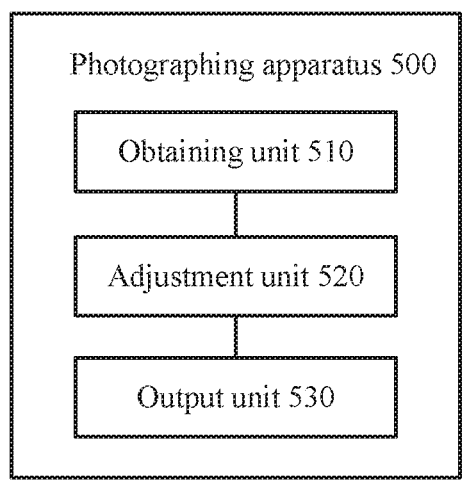

FIG. 5

PHOTOGRAPHING METHOD AND PHOTOGRAPHING APPARATUS FOR TERMINAL, AND TERMINAL

CROSS-REFERENCE TO RELATED APPLICATIONS

This application is a national stage application of International Application No. PCT/CN2017/074707, filed on Feb. 24, 2017, which claims priority to Chinese Patent Application No. 201710061843.6, filed on Jan. 26, 2017. Both of the aforementioned applications are hereby incorporated by reference in their entireties.

TECHNICAL FIELD

This application relates to the field of terminal technologies, and more specifically, to a photographing method, a photographing apparatus, and a terminal in the field of terminal technologies.

BACKGROUND

With rapid development of terminal technologies, a terminal has a higher configuration and stronger functions. A photographing function of the terminal has become an indispensable element for recording wonderful life. A terminal product having a photographing function is generally equipped with a camera module. Most products in camera modules are fixed-focus cameras. A fixed-focus camera has a fixed angle of view (field of view, FOV).

As a result, when a user wants to take a group photo, because a camera has a fixed photographable angle of view, some to-be-photographed persons may be not included in the angle of view of the camera, resulting in a failure to photograph all persons. Therefore, a photographing effect is relatively poor, and user experience is affected.

SUMMARY

Embodiments of this application provide a photographing method and a photographing apparatus for a terminal, and a terminal, to improve a photographing effect of the terminal, and improve user experience.

According to a first aspect, this application provides a photographing method for a terminal, where the photographing method includes:

obtaining a first preview picture collected by a camera, where an angle of view FOV of the camera is a first FOV value, the camera collects the first preview picture based on a second FOV value, and the second FOV value is less than the first FOV value;

adjusting the second FOV value to a third FOV value when it is detected that a quantity of at least one target human face in the first preview picture is greater than a first preset value, where the third FOV value is greater than the second FOV value, and the third FOV value is less than or equal to the first FOV value; and outputting an image that is photographed by the camera based on the third FOV value.

It should be understood that a range that a camera can cover is referred to as an angle of view (FOV), and an object beyond the angle of view is not displayed in an imaging area of the camera. The angle of view is generally represented by an angle, and an area included in a visible image formed by a to-be-photographed object on a focal point plane through the camera is referred to as a field of view. The camera in this embodiment of this application may be a camera of a terminal.

Optionally, the first FOV value may be a maximum capability value of the camera, and the second FOV value may be a photographable value of the camera. In other words, the second FOV value is less than the first FOV value, and the FOV of the camera may be adjusted between the photographable value and the maximum value.

It should be understood that a quantity of target human faces being greater than the first preset value means that a user wants to photograph a relatively large quantity of persons, and some human faces may be not included in the picture. In this case, to present all to-be-photographed human faces in the picture, a photographing angle of view of the camera needs to be enlarged, to present, in the picture, all the human faces that the user wants to photograph.

It should also be understood that a pixel ratio of a first target human face being less than a second preset value means that the user wants to photograph a relatively large background range, and some background pictures may be not included in the picture. In this case, to present all to-be-photographed backgrounds in the picture, the photographing angle of view of the camera needs to be enlarged, to present, in the picture, all sights that the user wants to photograph.

It should also be understood that the quantity of the target human faces being greater than the first preset value and the pixel ratio of the first target human face is less than the second preset value means that the user wants to take a group photo including more background sights. In this case, to meet a photographing requirement of the user, the photographing angle of view of the camera needs to be enlarged, to present, in the picture, all to-be-photographed scenes that the user wants to photograph.

According to the photographing method provided in this embodiment of this application, when detecting that the first preview picture meets a FOV adjustment condition, the terminal may automatically increase the FOV value of the camera, thereby improving a photographing effect of the terminal.

In a possible implementation of the first aspect, the photographing method provided in this embodiment of this application further includes: When detecting that the quantity of the at least one target human face in the first preview picture is less than or equal to a third preset value, the terminal may adjust the second FOV value to a fourth FOV value, and output an image that is collected by the camera based on the fourth FOV value, where the fourth FOV value is less than or equal to the second FOV value.

In a possible implementation, the adjusting the second FOV value to a third FOV value when it is detected that a quantity of at least one target human face in the first preview picture is greater than a first preset value includes: adjusting the second FOV value to the third FOV value when it is detected that the quantity of the at least one target human face in the first preview picture is greater than the first preset value, and a ratio of pixels of a first target human face in the at least one target human face to pixels of the first preview picture is less than a second preset value, where the pixels of the first target human face are greater than pixels of each target human face.

It should be understood that, for ease of description, in this embodiment of this application, a ratio of pixels of a human face/pixels of a target human face/the pixels of the first target human face to the pixels of the first preview picture is collectively referred to as a pixel ratio of the human face/the target human face/the first target human face.

Optionally, the terminal may perform FOV calculation and adjustment when detecting that at least one of the pixel ratio of the first target human face or the quantity of the at least one target human face meets a FOV adjustment condition. This is not limited in this embodiment of this application.

In a possible implementation, before the adjusting the second FOV value to a third FOV value when it is detected that a quantity of at least one target human face in the first preview picture is greater than a first preset value, the photographing method further includes: obtaining image information of the first preview picture, where the image information includes at least one piece of the following information: the quantity of the at least one target human face, the pixels of each target human face, a location of each target human face, a distortion parameter of the camera during collection of the first preview picture, a focal length of the camera during collection of the first preview picture, and a distance between the camera and a to-be-photographed object during collection of the first preview picture.

In an optional embodiment, the terminal may prestore a first mapping relationship between a quantity of human faces and a FOV value, and determine the third FOV value based on the quantity of the target human faces and the first mapping relationship.

In another optional embodiment, the terminal may prestore a human face quantity threshold and a second mapping relationship between a human face quantity difference and a FOV adjustment value, calculate a human face quantity difference based on the quantity of the target human faces in the first preview picture and the human face quantity threshold, and determine the third FOV value based on the human face quantity difference and the second mapping relationship.

In still another optional embodiment, the terminal may prestore a third mapping relationship between a pixel ratio of a human face and a FOV value, and determine the third FOV value based on the pixel ratio of the first target human face and the third mapping relationship.

In still another optional embodiment, the terminal may determine the third FOV value based on a fourth mapping relationship between a pixel ratio difference of the first target human face and a FOV adjustment value.

In still another optional embodiment, the terminal may determine the third FOV value based on the quantity of the target human faces and the pixel ratio of the first target human face.

In a possible implementation, the determining the third FOV value based on the image information includes:

determining, based on the distortion parameter of the camera and a first resolution of the first preview picture, a picture loss of each of P pixels included in the first preview picture at the first resolution, where the first resolution is corresponding to the second FOV value;

determining Q pixels that are in the P pixels and whose picture losses are less than a preset picture loss threshold as a second resolution, where Q is less than or equal to P, and the second resolution is less than or equal to the first resolution; and determining the third FOV value based on the first resolution, the second resolution, and the second FOV value.

In a possible implementation, the third FOV value $f_3\_code$ of the camera is determined based on the following formula:

$$f_3\_code = f_1\_min + (Vcm\_code - Vcm\_min) * \left(\frac{f_1\_max - f_1\_min}{Vcm\_max - Vcm\_min}\right),$$

where

Vcm_min is a minimum focal length of the camera, $f_1\_min$ is a minimum FOV value corresponding to the minimum focal length, Vcm_max is a maximum focal length of the camera, $f_1\_max$ is a maximum FOV value corresponding to the maximum focal length, and Vcm_code is the focal length of the camera during collection of the first preview picture.

In a possible implementation, the third FOV value $f_3\_dis$ of the camera is determined based on the following formula:

$$f_3\_dis = f_2\_min + (L\_dis - L\_min) * \left(\frac{f_2\_max - f_2\_min}{L\_max - L\_min}\right),$$

where

L_min is a minimum distance between the camera and the to-be-photographed object, $f_2\_min$ is a minimum FOV value corresponding to the minimum distance, L_max is a maximum distance between the camera and the to-be-photographed object, $f_2\_max$ is a maximum FOV value corresponding to the maximum distance, and L_dis is the distance between the camera and the to-be-photographed object during collection of the first preview picture.

In a possible implementation, the image information includes N pieces of information, where N is greater than or equal to 1, and the determining the third FOV value based on the image information includes: determining M FOV values based on M of the N pieces of information, where the M pieces of information are in one-to-one correspondence with the M FOV values, and M is less than or equal to N; and determining a largest value in the M FOV values as the third FOV value.

According to the photographing method provided in this embodiment of this application, the terminal uses the largest value in the M FOV values as the third FOV value, thereby further ensuring that a to-be-photographed scene is presented in the picture as much as possible, and optimizing a photographing effect.

In a possible implementation, before the adjusting the second FOV value to a third FOV value when it is detected that a quantity of at least one target human face in the first preview picture is greater than a first preset value, the photographing method further includes: detecting human face information of the first preview picture, where the human face information includes at least one piece of the following information: a quantity of at least one human face, pixels of each human face, a location of each human face, or a turning angle of each human face; and determining the quantity of the at least one target human face based on the human face information.

In an optional embodiment, the terminal may determine the quantity of the at least one target human face based on the quantity of the at least one human face and the pixels of each human face.

In another optional embodiment, the terminal may determine the quantity of the at least one target human face based on the quantity of the at least one human face, the pixels of each human face, the location of each human face, and the turning angle of each human face.

According to the photographing method provided in this embodiment of this application, a valid target human face is determined from human faces in the first preview picture, thereby improving accuracy of a photographed picture.

In a possible implementation, before the adjusting the second FOV value to the third FOV value when it is detected that the quantity of the at least one target human face in the first preview picture is greater than the first preset value, and a ratio of pixels of a first target human face in the at least one target human face to pixels of the first preview picture is less than a second preset value, the photographing method further includes: determining human face pixels corresponding to a human face box of each target human face and human face pixels corresponding to each of at least one target facial organ included in each target human face, where the target facial organ is an eye, a nose, or a mouth; and determining the pixels of each target human face based on the human face pixels corresponding to the human face box of each target human face and the human face pixels corresponding to each of the at least one target facial organ.

In a possible implementation, the determining human face pixels corresponding to a human face box of each target human face and human face pixels corresponding to each of at least one target facial organ included in each target human face includes: determining pixels of a first target facial organ in the at least one target facial organ; performing multi-frame smoothing processing on the pixels of the first target facial organ, to obtain a ratio of the pixels of the first target facial organ to the human face pixels corresponding to the human face box in the first preview picture; and determining human face pixels corresponding to the first target facial organ based on the pixels of the first target facial organ and the ratio of the pixels of the first target facial organ to the human face pixels corresponding to the human face box.

In a possible implementation, before the determining human face pixels corresponding to a human face box of each target human face and human face pixels corresponding to each of at least one target facial organ included in each target human face, the photographing method further includes: obtaining a confidence of a first facial organ, where the first facial organ is an eye, a nose, or a mouth; and determining the first facial organ as the target facial organ based on the confidence of the first facial organ and a preset confidence threshold.

In a possible implementation, a definition of the first preview picture is higher than a definition of the image, and before the outputting an image that is photographed by the camera based on the third FOV value, the photographing method further includes: cropping the first preview picture at a first rate, to obtain an edge picture of the first preview picture; and performing definition compensation processing on the image based on the edge picture, to obtain the processed image.

According to the photographing method provided in this embodiment of this application, because the first preview picture is collected by the terminal based on the second FOV value, the output image is collected by the terminal based on the third FOV value, and the second FOV value is less than the third FOV value, the definition of the output image is less than the definition of the first preview picture, and the terminal may increase the definition of the output image through definition compensation.

Optionally, in addition to performing image processing to increase the definition of the output image, the terminal may further increase a resolution or the like of the output image to optimize the output image. This is not limited in this embodiment of this application.

According to a second aspect, this application provides another photographing method for a terminal, where the terminal includes a first camera and a second camera, the first camera and the second camera are disposed in parallel on a body of the terminal, and the photographing method includes:

obtaining a first preview picture collected by the first camera or the second camera, where an angle of view FOV of the first camera is a first FOV value, a FOV of the second camera is a second FOV value, the first FOV value is less than the second FOV value, the first preview picture is collected based on a third FOV value, and the third FOV value is less than the second FOV value;

adjusting the third FOV value to a fourth FOV value when it is detected that a quantity of at least one target human face in the first preview picture is greater than a first preset value, where the fourth FOV value is greater than the third FOV value; and performing camera switching based on the fourth FOV value.

In a possible implementation, the performing camera switching based on the fourth FOV value includes: switching from the first camera to the second camera if the first preview picture is collected by the first camera and the fourth FOV value is greater than the first FOV value; or switching from the second camera to the first camera if the first preview picture is collected by the second camera and the fourth FOV value is less than or equal to the first FOV value.

In a possible implementation, the adjusting the third FOV value to a fourth FOV value when it is detected that a quantity of at least one target human face in the first preview picture is greater than a first preset value includes: adjusting the third FOV value to the fourth FOV value when it is detected that the quantity of the at least one target human face in the first preview picture is greater than the first preset value, and a ratio of pixels of a first target human face in the at least one target human face to pixels of the first preview picture is less than a second preset value, where the pixels of the first target human face are greater than pixels of each target human face.

In a possible implementation, before the adjusting the third FOV value to a fourth FOV value when it is detected that a quantity of at least one target human face in the first preview picture is greater than a first preset value, the photographing method further includes: obtaining image information of the first preview picture, where the image information includes at least one piece of the following information: the quantity of the at least one target human face, the pixels of each target human face, a location of each target human face, a distortion parameter of the camera collecting the first preview picture, a focal length of the camera collecting the first preview picture, and a distance between the camera collecting the first preview picture and a to-be-photographed object; and determining the fourth FOV value based on the image information.

According to the camera switching method provided in this embodiment of this application, when detecting that the first preview picture meets a FOV adjustment condition, the terminal can automatically increase the FOV value, and automatically perform camera switching based on the adjusted FOV value, to improve a photographing effect of the terminal.

According to a third aspect, this application provides a terminal, where the terminal includes a processor, a memory, a display, and a camera, where the camera is configured to photograph a static or dynamic image;

the memory is configured to store the image photographed by the camera;

the display is configured to display an image output by the processor; and the processor is configured to: obtain a first preview picture collected by the camera, where an angle of view FOV of the camera is a first FOV value, the camera collects the first preview picture based on a second FOV value, and the second FOV value is less than the first FOV value; adjust the second FOV value to a third FOV value when it is detected that a quantity of at least one target human face in the first preview picture is greater than a first preset value, where the third FOV value is greater than the second FOV value, and the third FOV value is less than or equal to the first FOV value; and output an image that is photographed by the camera based on the third FOV value.

According to the photographing method provided in this embodiment of this application, when detecting that the first preview picture meets a FOV adjustment condition, the terminal may automatically increase the FOV value of the camera, thereby improving a photographing effect of the terminal.

In a possible implementation, the processor is specifically configured to adjust the second FOV value to the third FOV value when it is detected that the quantity of the at least one target human face in the first preview picture is greater than the first preset value, and a ratio of pixels of a first target human face in the at least one target human face to pixels of the first preview picture is less than a second preset value, where the pixels of the first target human face are greater than pixels of each target human face.

In a possible implementation, the processor is further configured to: before adjusting the second FOV value to the third FOV value when it is detected that the quantity of the at least one target human face in the first preview picture is greater than the first preset value, obtain image information of the first preview picture, where the image information includes at least one piece of the following information: the quantity of the at least one target human face, the pixels of each target human face, a location of each target human face, a distortion parameter of the camera during collection of the first preview picture, a focal length of the camera during collection of the first preview picture, and a distance between the camera and a to-be-photographed object during collection of the first preview picture; and determine the third FOV value based on the image information.

In a possible implementation, the processor is specifically configured to: determine, based on the distortion parameter of the camera and a first resolution of the first preview picture, a picture loss of each of P pixels included in the first preview picture at the first resolution, where the first resolution is corresponding to the second FOV value; determine Q pixels that are in the P pixels and whose picture losses are less than a preset picture loss threshold as a second resolution, where Q is less than or equal to P, and the second resolution is less than or equal to the first resolution; and determine the third FOV value based on the first resolution, the second resolution, and the second FOV value.

In a possible implementation, the processor is specifically configured to determine the third FOV value $f_3\_code$ of the camera based on the following formula:

$$f_3\_code = f_1\_min + (Vcm\_code - Vcm\_min) * \left(\frac{f_1\_max - f_1\_min}{Vcm\_max - Vcm\_min}\right),$$

where

Vcm_min is a minimum focal length of the camera, $f_1\_min$ is a minimum FOV value corresponding to the minimum focal length, Vcm_max is a maximum focal length of the camera, $f_1\_max$ is a maximum FOV value corresponding to the maximum focal length, and Vcm_code is the focal length of the camera during collection of the first preview picture.

In a possible implementation, the processor is specifically configured to determine the third FONT value $f_3\_dis$ of the camera based on the following formula:

$$f_3\_dis = f_2\_min + (L\_dis - L\_min) * \left(\frac{f_2\_max - f_2\_min}{L\_max - L\_min}\right),$$

where

L_min is a minimum distance between the camera and the to-be-photographed object, $f_2\_min$ is a minimum FOV value corresponding to the minimum distance, L_max is a maximum distance between the camera and the to-be-photographed object, $f_2\_max$ is a maximum FONT value corresponding to the maximum distance, and L_dis is the distance between the camera and the to-be-photographed object during collection of the first preview picture.

In a possible implementation, the processor is specifically configured to determine M FOV values based on M of the N pieces of information, where the M pieces of information are in one-to-one correspondence with the M FOV values, and M is less than or equal to N; and determine a largest value in the M FOV values as the third FOV value.

In a possible implementation, the processor is further configured to: before adjusting the second FOV value to the third FOV value when it is detected that the quantity of the at least one target human face in the first preview picture is greater than the first preset value, detect human face information of the first preview picture, where the human face information includes at least one piece of the following information: a quantity of at least one human face, pixels of each human face, a location of each human face, or a turning angle of each human face; and determine the quantity of the at least one target human face based on the human face information.

In a possible implementation, the processor is further configured to: before adjusting the second FOV value to the third FOV value when it is detected that the quantity of the at least one target human face in the first preview picture is greater than the first preset value, and the ratio of the pixels of the first target human face in the at least one target human face to the pixels of the first preview picture is less than the second preset value, determine human face pixels corresponding to a human face box of each target human face and human face pixels corresponding to each of at least one target facial organ included in each target human face, where the target facial organ is an eye, a nose, or a mouth; and determine the pixels of each target human face based on the human face pixels corresponding to the human face box of each target human face and the human face pixels corresponding to each of the at least one target facial organ.

In a possible implementation, the processor is specifically configured to: determine pixels of a first target facial organ in the at least one target facial organ; perform multi-frame smoothing processing on the pixels of the first target facial organ, to obtain a ratio of the pixels of the first target facial organ to the human face pixels corresponding to the human face box in the first preview picture; and determine human face pixels corresponding to the first target facial organ based on the pixels of the first target facial organ and the ratio of the pixels of the first target facial organ to the human face pixels corresponding to the human face box.

In a possible implementation, the processor is further configured to: before determining the human face pixels corresponding to the human face box of each target human face and the human face pixels corresponding to each of the at least one target facial organ included in each target human face, obtain a confidence of a first facial organ, where the first facial organ is an eye, a nose, or a mouth; and determine the first facial organ as the target facial organ based on the confidence of the first facial organ and a preset confidence threshold.

In a possible implementation, a definition of the first preview picture is higher than a definition of the image, and the processor is further configured to: before outputting the image that is photographed by the camera based on the third FOV value, crop the first preview picture at a first rate, to obtain an edge picture of the first preview picture; and perform definition compensation processing on the image based on the edge picture, to obtain the processed image.

According to a fourth aspect, this application provides another terminal, where the terminal includes a processor, a memory, a display, a first camera, and a second camera, where the first camera and the second camera are disposed in parallel on a body of the terminal, and the first camera and the second camera are configured to photograph a static or dynamic image;

the memory is configured to store the image photographed by the first camera and/or the second camera;

the display is configured to display the image photographed by the first camera and/or the second camera; and the processor is configured to obtain a first preview picture collected by the first camera or the second camera, where an angle of view FOV of the first camera is a first FOV value, a FOV of the second camera is a second FOV value, the first FOV value is less than the second FOV value, the first preview picture is collected based on a third FOV value, and the third FOV value is less than the second FOV value; adjust the third FOV value to a fourth FOV value when it is detected that a quantity of at least one target human face in the first preview picture is greater than a first preset value, where the fourth FOV value is greater than the third FOV value; and perform camera switching based on the fourth FOV value.

According to the camera switching method provided in this embodiment of this application, when detecting that the first preview picture meets a FOV adjustment condition, the terminal can automatically increase the FOV value, and automatically perform camera switching based on the adjusted FOV value, to improve a photographing effect of the terminal.

In a possible implementation, the processor is specifically configured to switch from the first camera to the second camera if the first preview picture is collected by the first camera and the fourth FOV value is greater than the first FOV value; or switch from the second camera to the first camera if the first preview picture is collected by the second camera and the fourth FOV value is less than or equal to the first FOV value.

In a possible implementation, the processor is specifically configured to adjust the third FOV value to the fourth FOV value when it is detected that the quantity of the at least one target human face in the first preview picture is greater than the first preset value, and a ratio of pixels of a first target human face in the at least one target human face to pixels of the first preview picture is less than a second preset value, where the pixels of the first target human face are greater than pixels of each target human face.

In a possible implementation, the processor is further configured to: before adjusting the third FOV value to the fourth FOV value when it is detected that the quantity of the at least one target human face in the first preview picture is greater than the first preset value, obtain image information of the first preview picture, where the image information includes at least one piece of the following information: the quantity of the at least one target human face, the pixels of each target human face, a location of each target human face, a distortion parameter of the camera collecting the first preview picture, a focal length of the camera collecting the first preview picture, and a distance between the camera collecting the first preview picture and a to-be-photographed object; and determine the fourth FOV value based on the image information.

According to a fifth aspect, this application provides a photographing apparatus, configured to perform the photographing method in the first aspect or the implementations of the first aspect. Specifically, the photographing apparatus includes units configured to perform the photographing method in the first aspect or the implementations of the first aspect.

According to a sixth aspect, this application provides another photographing apparatus, configured to perform the photographing method in the second aspect or the implementations of the second aspect. Specifically, the photographing apparatus includes units configured to perform the photographing method in the second aspect or the implementations of the second aspect.

According to a seventh aspect, this application provides a computer program product including an instruction, and when the computer program product runs on a computer, the computer performs the photographing method in the first aspect or the implementations of the first aspect.

According to an eighth aspect, this application provides another computer program product including an instruction, and when the computer program product runs on a computer, the computer performs the photographing method in the second aspect or the implementations of the second aspect.

BRIEF DESCRIPTION OF DRAWINGS

FIG. 2 is a schematic flowchart of a photographing method according to an embodiment of this application;

FIG. 4 is a schematic flowchart of another photographing method according to an embodiment of this application;

FIG. 5 is a schematic block diagram of a photographing apparatus according to an embodiment of this application;

DESCRIPTION OF EMBODIMENTS

The following describes the technical solutions in this application with reference to accompanying drawings.

The technical solutions in the embodiments of this application may be applied to all terminals having cameras. The terminal may be mobile or fixed. For example, the terminal may be a camera, a video camera, a tablet personal computer (tablet personal computer), a smart television, a laptop computer (laptop computer), a personal digital assistant (personal digital assistant, PDA), a personal computer (personal computer), or a wearable device (wearable device) such as a smartwatch. This is not limited in the embodiments of this application.

Figure 1:
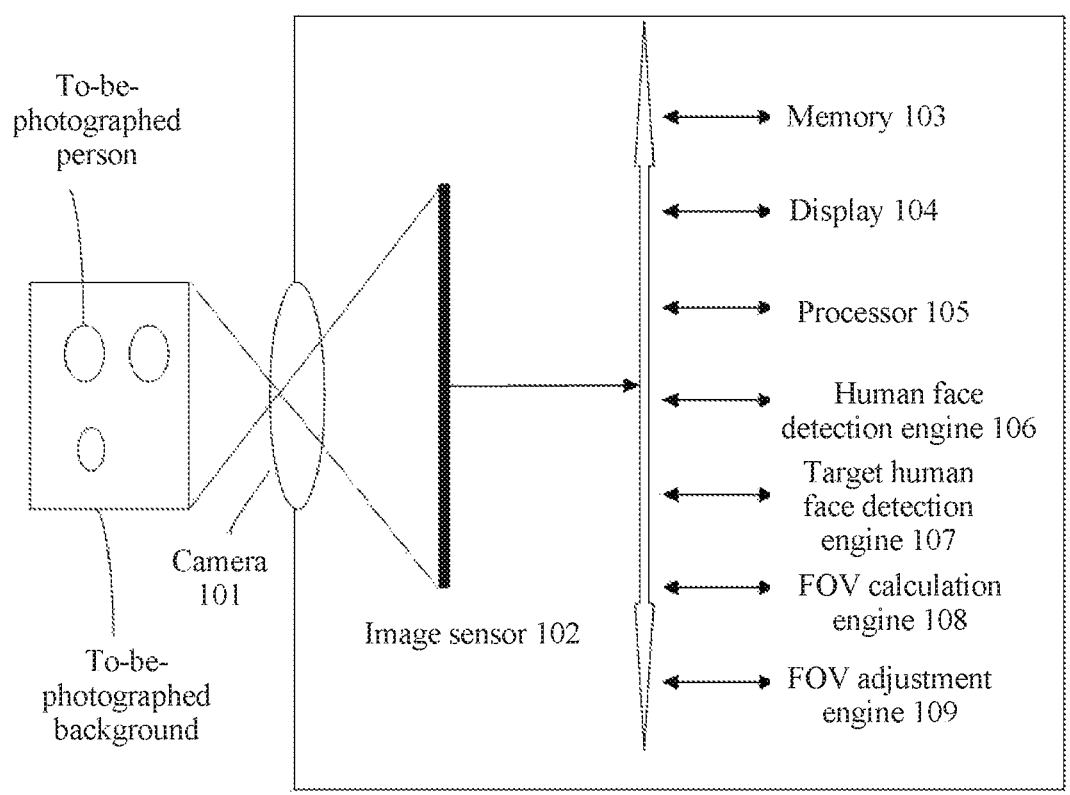
FIG. 1 is a schematic structural diagram of a photographing apparatus according to an embodiment of this application.

FIG. 1 is a schematic structural diagram of a photographing apparatus 100 according to an embodiment of this application. The photographing apparatus 100 includes at least one camera (a camera 101), at least one image sensor (FIG. 1 shows an image sensor 102), a memory 103, a display 104, a human face detection engine 105, a processor 106, a target human face detection engine 107, a FOV calculation engine 108, and a FOV adjustment engine 109. A FOV of the camera is a first FOV value.

Optionally, the photographing apparatus provided in this embodiment of this application may be an independent apparatus, or may be integrated in a terminal, or may be a terminal. This is not limited in this embodiment of this application.

It should be understood that a range that a camera can cover is referred to as an angle of view (FOV), and an object beyond the angle of view is not displayed in an imaging area of the camera. The angle of view is generally represented by an angle, and an area included in a visible image formed by a to-be-photographed object on a focal point plane through the camera is referred to as a field of view. The camera in this embodiment of this application may be a camera of a terminal.

Optionally, the first FOV value may be a maximum capability value of the camera, and a second FOV value may be a photographable value of the camera. In other words, the second FOV value is less than the first FOV value, and the FOV of the camera may be adjusted between the photographable value and the maximum value.

The camera 101 is configured to capture information about a to-be-photographed scene. The to-be-photographed scene includes a to-be-photographed background and/or a to-be-photographed person. The camera captures an image based on the second FOV value. The second FOV value is less than the first FOV value.

The image sensor 102 is configured to present, in an imaging area, an image that is captured by the camera 101 and that is of a static or dynamic to-be-photographed object, and transfer the image to the memory.

The memory 103 is configured to store the image transferred by the image sensor 102.

The display 104 is configured to display the image stored in the memory 103.

The processor 105 is configured to control the human face detection engine 106, the target human face detection engine 107, the FOV calculation engine 108, and the FOV adjustment engine 109 to adjust the FOV value of the camera.

The human face detection engine 106 is configured to obtain the image from the memory 103, and recognize a human face in the image.

The target human face detection engine 107 is configured to detect target human face in all human faces recognized by the human face detection engine 106.

The FOV calculation engine 108 is configured to determine an optimum FOV value when the target human face detection engine 107 detects that a quantity of target human faces in the image is greater than a first preset value. The optimum FOV value is greater than the second FOV value, and the optimum FOV value is less than or equal to the first FOV value.

The FOV adjustment engine 109 is configured to adjust the FOV of the camera based on the optimum FOV value obtained by the FOV calculation engine 108.

Optionally, when the optimum FOV value is greater than the capability value of the camera, the capability value of the camera is used as the optimum FOV value. In other words, the optimum FOV value is less than or equal to the first FOV value.

It should be understood that a quantity of target human faces in a picture being greater than the first preset value means that a user wants to photograph a relatively large quantity of persons, and some human faces may be not included in the picture. In this case, to present all to-be-photographed human faces in the picture, an angle of view of the camera needs to be enlarged, to present, in the picture, all human faces that the user wants to photograph.

The photographing apparatus provided in this embodiment of this application can automatically increase the FOV of the camera to meet a photographing requirement of the user, improving a photographing effect.

Optionally, the photographing apparatus provided in this embodiment of this application may include a plurality of cameras, for example, a first camera and a second camera. A FOV of the first camera is a first FOV value, and a FOV of the second camera is a second FOV value. The photographing apparatus may obtain a picture photographed by the first camera or the second camera, where the picture is photographed based on a third FOV value. The photographing apparatus may perform FOV calculation based on image information of the picture to obtain an optimum FOV value, and switch between the plurality of cameras based on the FOV value.

Optionally, the photographing apparatus may preset the first camera as a primary camera and the second camera as a secondary camera. When a photographing function of the photographing apparatus is enabled, the primary camera is used by default for photographing. After determining the optimum FOV value, the photographing apparatus switches to a most appropriate camera based on the optimum FOV value. This is not limited in this embodiment of this application.

The photographing apparatus provided in this embodiment of this application can automatically switch between the plurality of cameras depending on a to-be-photographed scene requirement.

FIG. 2 is a schematic flowchart of a photographing method 200 according to an embodiment of this application. The photographing method 200 may be performed by, for example, a terminal, and the terminal includes a camera. This embodiment of this application is not limited thereto.

S210. Obtain a first preview picture collected by a camera, where an angle of view FOV of the camera is a first FOV value, the camera collects the first preview picture based on a second FOV value, and the second FOV value is less than the first FOV value.

S220. Adjust the second FOV value to a third FOV value when it is detected that a quantity of at least one target human face in the first preview picture is greater than a first preset value, where the third FOV value is greater than the second FOV value, and the third FOV value is less than or equal to the first FOV value.

S230. Output an image that is photographed by the camera based on the third FOV value.

Optionally, the first FOV value may be a maximum capability value of the camera, and the second FOV value may be a photographable value of the camera. In other words, the second FOV value is less than the first FOV value, and the FOV of the camera may be adjusted between the photographable value and the maximum value.

For example, the maximum FOV value of the camera may be 90 degrees, and the photographable FOV value of the camera may be 80 degrees. This is not limited in this embodiment of this application.

Optionally, alternatively, the first FOV value may be a FOV value adjusted in previous photographing of the terminal, and the second FOV value may be a photographable value used in current photographing. This is not limited in this embodiment of this application.

According to the photographing method provided in this embodiment of this application, when detecting that the first preview picture meets a FOV adjustment condition, the terminal may automatically increase the FOV value of the camera, thereby improving a photographing effect of the terminal.

Optionally, the photographing method provided in this embodiment of this application further includes: When detecting that the quantity of the at least one target human face in the first preview picture is less than or equal to a third preset value, the terminal may adjust the second FOV value to a fourth FOV value, and output an image that is collected based on the fourth FOV value. The fourth FOV value is less than or equal to the second FOV value.

According to the photographing method provided in this embodiment of this application, when detecting that the first preview picture does not meet a FOV adjustment condition, the terminal may maintain the FOV value currently used by the camera, or automatically reduce the FOV value of the camera.

For ease of description, in the following description, a ratio of pixels of a human face/pixels of a target human face/the pixels of the first target human face to pixels of the first preview picture is collectively referred to as a pixel ratio of the human face/the target human face/the first target human face.

Optionally, in S220, the terminal may perform FOV calculation and adjustment when detecting that at least one of the pixel ratio of the first target human face or the quantity of the at least one target human face meets a FOV adjustment condition. This is not limited in this embodiment of this application.

It should be understood that a quantity of target human faces being greater than the first preset value means that a user wants to photograph a relatively large quantity of persons, and some human faces may be not included in the picture. In this case, to present all to-be-photographed human faces in the picture, a photographing angle of view of the camera needs to be enlarged, to present, in the picture, all human faces that the user wants to photograph.

It should also be understood that the pixel ratio of the first target human face being less than a second preset value means that the user wants to photograph a relatively large background range, and some background pictures may be not included in the picture. In this case, to present all to-be-photographed backgrounds in the picture, the photographing angle of view of the camera needs to be enlarged, to present, in the picture, all sights that the user wants to photograph.

It should also be understood that the quantity of the target human faces being greater than the first preset value and the pixel ratio of the first target human face is less than the second preset value means that the user wants to take a group photo including more background sights. In this case, to meet a photographing requirement of the user, the photographing angle of view of the camera needs to be enlarged, to present, in the picture, all to-be-photographed scenes that the user wants to photograph.

Optionally, the first preset value is a human face quantity threshold, and the second preset value is a pixel ratio threshold. The first preset value and the second preset value may be set by the user based on a requirement or experience of the user, or set by the terminal based on historical setting or recording, and the FOV of the camera can be maximally adjusted only to the maximum capability value of the camera.

In an optional embodiment, when detecting that the quantity of the at least one target human face in the first preview picture is greater than the first preset value, the terminal may adjust the second FOV value to the third FOV value. The third FOV value is greater than the second FOV value.

For example, the user wants to take a group photo of seven persons, the camera collects the first preview picture based on an 80-degree photographable FOV, and the human face quantity threshold is preset to three human faces. When it is detected that the first preview picture includes six human faces, it indicates that the user wants the camera to photograph currently presented six persons or more persons. Therefore, the angle of view of the camera may be enlarged by increasing the FOV value, so that all to-be-photographed human faces are included in the picture.

In another optional embodiment, when detecting that the pixel ratio of the first target human face is less than the second preset value, the terminal may adjust the second FOV value to the third FOV value. The pixels of the first target human face are largest in pixels of all of the at least one target human face. In other words, the first target human face may be a main person in the picture.

For example, the user wants to photograph with the Eiffel Tower as a background, the camera collects the first preview picture based on an 80-degree photographable FOV, the pixels of the first preview picture are 800,000 pixels, and the human face pixel ratio threshold is preset to 5%. When detecting that the pixel ratio of the first target human face in the first preview picture is 3%, it indicates that the user wants that the camera can present the Eiffel Tower in the picture as much as possible. Therefore, the angle of view of the camera may be enlarged by increasing the FOV value, so that all to-be-photographed backgrounds are included in the picture.

Optionally, the pixels of the first target human face may be greater than pixels of each target human face in the first preview picture, or the pixels of the first target human face may be greater than a sum of pixels of all the target human faces in the first preview picture. This is not limited in this embodiment of this application.

Optionally, before S220, the terminal may obtain image information of the first preview picture, and determine the third FOV value based on the image information.

Optionally, the terminal may smoothly adjust the second FOV value to the third FOV value, for example, increase a FOV value of each frame by one degree, to avoid a frame skip in a photographed picture.

Optionally, the image information may include at least one piece of the following information: the quantity of the at least one target human face, the pixels of each target human face, a location of each target human face, a distortion parameter of the camera during collection of the first preview picture, a focal length of the camera during collection of the first preview picture, and a distance between the camera and a to-be-photographed object during collection of the first preview picture.

In an optional embodiment, the terminal may prestore a first mapping relationship between a quantity of human faces and a FOV value, and determine the third FOV value based on the quantity of the target human faces and the first mapping relationship.

For example, the terminal may preset a corresponding FOV value of the camera to 80 degrees when a quantity of human faces is 3, and preset a corresponding FOV value of the camera to 85 degrees when a quantity of human faces is 4. Then, when detecting that the quantity of the target human faces in the first preview picture is 3, the terminal may increase a current photographing FOV of the camera from 80 degrees to 85 degrees.

In another optional embodiment, the terminal may prestore the human face quantity threshold and a second mapping relationship between a human face quantity difference and a FOV adjustment value, calculate a human face quantity difference based on the quantity of the target human faces in the first preview picture and the human face quantity threshold, and determine the third FOV value based on the human face quantity difference and the second mapping relationship.

For example, the terminal may preset the human face quantity threshold to 3, and calculate a human face quantity difference as 2 when detecting that the quantity of the target human faces in the first preview picture is 5, and then based on a second mapping relationship of increasing a FOV value by two degrees for each one more human face, the terminal may adjust a current photographing FOV of the camera from 80 degrees to 82 degrees.

In still another optional embodiment, the terminal may prestore a third mapping relationship between a pixel ratio of a human face and a FOV value, and determine the third FOV value based on the pixel ratio of the first target human face and the third mapping relationship.

For example, the terminal may preset a corresponding FOV value of the camera to 80 degrees when a pixel ratio of a human face is 5%, and preset a corresponding FOV value of the camera to 82 degrees when a pixel ratio of a human face is 4%. When detecting that the pixel ratio of the first target human face in the first preview picture is 4%, the terminal adjusts the FOV of the camera from current 80 degrees to 82 degrees. This is not limited in this embodiment of this application.

In still another optional embodiment, the terminal may alternatively determine the third FOV value based on a fourth mapping relationship between a pixel ratio difference of the first target human face and a FOV adjustment value. This is not limited in this embodiment of this application.

For example, the terminal may preset the pixel ratio threshold of the first target human face to 5%, and when the pixel ratio of the first target human face in the first preview picture is 2%, calculate a pixel ratio difference of the first target human face as 3%, and then based on a fourth mapping relationship of increasing a FOV value by one degree for each 1%-decrease in a pixel ratio, the terminal may adjust a current photographing FOV of the camera from 80 degrees to 83 degrees.

In still another optional embodiment, the terminal may determine the third FOV value based on the quantity of the target human faces and the pixel ratio of the first target human face.

For example, the third FOV value may be determined by using the following code:

```
If N_face >= N₁
    FOV 3 = f₁;
Else if N_face <= 0
    FOV 3 = f₂;
Else
    If A_mainFace >=A₁
        FOV 3 = f₃;
    Else if A_mainFace <A₁ && A_mainFace>0
        FOV 3 = f₄;
    End
End
``` where N_face represents the quantity of the target human faces, $N_1$ is the human face quantity threshold, A_mainFace represents the pixel ratio of the first target human face, where the pixel ratio of the first target human face is greater than a pixel ratio of each of the other target human faces, $A_1$ is the human face pixel ratio threshold of the first target human face, $f_1$, $f_2$, $f_3$, and $f_4$ are preset FOV values, $f_4 > f_3$, $f_1 > f_2$, and $f_1$ and $f_4$ are both less than or equal to the maximum FOV value of the camera.

In another optional embodiment, the terminal may determine the third FOV value based on a location of a target human face.

It should be understood that, in this embodiment of this application, the location of the target human face may be represented by proximity of a center coordinate point of the human face to a center point of a camera screen, namely, represented by a paraxial value of the target human face. A larger paraxial value indicates that the target human face is more proximal to the screen center. For example, if the center coordinate point of the target human face is at the center point of the screen, the paraxial value of the target human face may be defined as $R_1$; if the center coordinate point of the target human face is at a screen edge, the paraxial value of the target human face may be defined as $R_0$; if the center coordinate point of the human face is at another location of the screen, the paraxial value of the target human face may be defined as $R_i$.

For example, it is assumed that $R_1$ is 1, and a FOV value corresponding to $R_1$ is 80 degrees; it is assumed that $R_0$ is 0, and a FOV value corresponding to $R_0$ is 90 degrees. The terminal may preset a fifth mapping relationship between a paraxial value and a FOV value. For example, the FOV value is increased by one degree for each 0.1-decrease in a value of $R_i$. In this case, the terminal may determine the third FOV value based on the fifth mapping relationship and a smallest paraxial value in paraxial values of all human faces in the first preview picture. This is not limited in this embodiment of this application.

In still another optional embodiment, the terminal may determine, based on the distortion parameter of the camera and a first resolution of the first preview picture, a picture loss of each of P pixels included in the first preview picture at the first resolution, where the first resolution is corresponding to the second FOV value; determine Q pixels that are in the P pixels and whose picture losses are less than a preset picture loss threshold as a second resolution, where Q is less than or equal to P, and the second resolution is less than or equal to the first resolution; and determine the third FOV value based on the first resolution, the second resolution, and the second FOV value.

It should be understood that the distortion parameter is an inherent attribute of a photographing apparatus, and is used to describe a possible picture loss of a pixel at each location in a picture photographed by the photographing apparatus.

For example, it is assumed that the first resolution of the first preview picture is 1024×768. That is, in the picture, each horizontal line includes 1024 pixels, and each vertical line includes 768 pixels. Therefore, at the first resolution, the first preview picture has 1024×768 pixels in total. The terminal may team, based on the distortion parameter, a picture loss of a corresponding picture obtained after pixels on each outermost edge are removed from the first preview picture, to obtain a picture loss of a picture obtained after pixels on the first horizontal line, pixels on the last horizontal line, pixels on the first vertical line, and pixels on the last vertical line are removed from the first preview picture. To be specific, a picture loss of a picture whose resolution is 1022×766 is obtained. If the loss is less than the preset picture loss threshold, it indicates that the picture is a picture whose picture loss is acceptable, and the resolution corresponding to the picture is determined as the second resolution. Because the first resolution is corresponding to the second FOV value, the third FOV value may be determined based on the first resolution, the second resolution, and the second FOV value.

In still another optional embodiment, the terminal may determine the third FOV based on the focal length that is used by the camera when the first preview picture is collected.

Optionally, a voice coil motor (voil coli motor, VCM) is widely used among cameras to implement an auto-focus function, and the VCM may adjust a focal length of a lens, to present a clear image.

The focal length of the camera is a distance from an optical rear principal point of the camera to a focal point. A magnitude of the focal length of the camera decides an imaging size, a magnitude of an angle of view, a magnitude of a depth of field, and a perspective magnitude of a picture during photographing. The magnitude of the focal length decides a size of an image of a to-be-photographed object on an imaging medium, equivalent to a scale of the object and the image. When a same to-be-photographed target at a same distance is photographed, a longer focal length is corresponding to a larger image, and a shorter focal length is corresponding to a smaller image. A focal length of a camera lens varies greatly with different purposes, ranging from a few millimeters to a dozen millimeters, and up to several meters. The focal length of the camera may be represented by a value (for example, represented by a value ranging from 100 to 500). The value is defined as a VCM code, namely, Vcm_code.

For example, the terminal may determine the third FOV value $f_3\_code$ by using a formula (1):

$$f_3\_code = f_1\_min + (Vcm\_code - Vcm\_min) * \left( \frac{f_1\_max - f_1\_min}{Vcm\_max - Vcm\_min} \right) \quad (1)$$

where Vcm_min is a minimum focal length of the camera, $f_1\_min$ is a minimum FOV value corresponding to the minimum focal length, Vcm_max is a maximum focal length of the camera, $f_1\_max$ is a maximum FOV value corresponding to the maximum focal length, and Vcm_code is the focal length of the camera during collection of the first preview picture.

In still another optional embodiment, the terminal may determine the third FOV value based on the distance between the camera and the to-be-photographed object during collection of the first preview picture.

Optionally, the distance between the camera and the to-be-photographed object may be measured by using a laser ranging device of the terminal.

For example, the terminal may determine the third FOV value $f_3\_dis$ by using a formula (2):

$$f_3\_dis = f_2\_min + (L\_dis - L\_min) * \left( \frac{f_2\_max - f_2\_min}{L\_max - L\_min} \right) \quad (2)$$

where L_min is a minimum distance between the camera and the to-be-photographed object, $f_2\_min$ is a minimum FOV value corresponding to the minimum distance, L_max is a maximum distance between the camera and the to-be-photographed object, $f_2\_max$ is a maximum FOV value corresponding to the maximum distance, and L_dis is the distance between the camera and the to-be-photographed object during collection of the first preview picture.

Optionally, if the image information includes N pieces of information, where N is greater than or equal to 1, the determining the third FOV value based on the image information may be determining M FOV values based on M of the N pieces of information, and determining a largest value in the M FOV values as the third FOV value. The M pieces of information are in one-to-one correspondence with the M FOV values, and M is less than or equal to N.

Optionally, before S220, the terminal may detect human face information of the first preview picture. The human face information includes at least one piece of the following information: a quantity of at least one human face, pixels of each human face, a location of each human face, or a turning angle of each human face; and determine the quantity of the at least one target human face based on the human face information.

In an optional embodiment, the terminal may determine the quantity of the at least one target human face based on the quantity of the at least one human face.

For example, the terminal may preset the human face quantity threshold to 4, and when the terminal detects that a quantity of human faces in the first preview picture is less than or equal to 4, the terminal may use all the human faces in the first preview picture as target human faces.

In another optional embodiment, the terminal may determine the quantity of the at least one target human face based on the quantity of the at least one human face and the pixels of each human face.

For example, the terminal may preset the human face quantity threshold to 4, and when the terminal detects that a quantity of human faces in the first preview picture is 6, the terminal may use four human faces whose pixels are largest as target human faces.

In an optional embodiment, the terminal may determine the quantity of the at least one target human face based on the pixels of each human face.

For example, the terminal may preset a pixel threshold of a valid human face to 3,000 pixels. When the terminal detects four human faces, pixels of a first human face are 5,000 pixels, pixels of a second human face are 3,000 pixels, pixels of a third human face are 500 pixels, and pixels of a fourth human face are 1,000 pixels, the terminal may determine the first human face and the second human face whose pixels are greater than the human face pixel threshold as target human faces. Therefore, the quantity of the target human faces is 2.

In an optional embodiment, the terminal may determine the quantity of the at least one target human face based on the quantity of the at least one human face, the pixels of each human face, the location of each human face, and the turning angle of each human face.

For example, it is assumed that a quantity faceNum of human faces in a current scene is obtained based on a human face detection algorithm engine. If faceNum is 0, that is, there is no human face, a current quantity of target human faces is 0. If faceNum is 1, that is, there is one human face, if the human face is a frontal face (left and right turning angles ≤45 degrees), and a location of the human face is fixed, the human face is defined as a valid human face; if the human face is a non-frontal face (left and right turning angles >45 degrees), or the human face is moving, the human face is defined as an invalid human face. If faceNum≥2, first, an area of each human face is calculated and whether a location of the human face is fixed is detected, and then a human face occupying a largest area and having a fixed location is selected as a "main valid human face". All moving human faces are excluded. For another human face that has a fixed location and that is not a "main valid human face", it is determined whether a ratio of a human face area of the human face to that of the "main valid human face" is greater than a first threshold. If the ratio is greater than the first threshold, the human face is defined as a "secondary valid human face". Otherwise, the human face is defined as an invalid human face.

All "main valid human faces" and "secondary valid human faces" may be defined as target human faces, namely, protagonists in the picture. All invalid human faces are defined as passerby faces, namely, backgrounds in the picture.

Optionally, the terminal may spatially establish a virtual sphere centered on a "main valid human face" in the first preview picture with a first length as a radius. If detecting that a "secondary valid human face" is spatially located outside the virtual sphere, the terminal considers the "secondary valid human face" as an invalid human face. In other words, the "secondary valid human face" is possibly of an unrelated passerby near a close shot of the camera. Otherwise, the terminal considers the "secondary valid human face" as a target human face. Similarly, in this embodiment of this application, a three-dimensional space, centered on the "main valid face", of another shape may be established, or a center axis of the first preview picture may be used as a center. This is not limited in this embodiment of this application.

According to the photographing method provided in this embodiment of this application, a valid target human face is determined from human faces in the first preview picture, thereby improving accuracy of a photographed picture.

Optionally, the terminal may crop the first preview picture at a first rate to obtain an edge picture of the first preview picture, and perform definition compensation processing on the output image based on the edge picture, to obtain a higher-definition output image.

In an optional embodiment, the terminal may crop the first preview picture at the first rate to obtain the edge picture of the first preview picture, and perform, based on the edge picture, single-frame lossless amplification processing on the output image at a second rate, to compensate for a definition of the output image. The first rate is greater than 1, the second rate is greater than 0 and less than 1, and the first rate and the second rate are reciprocal of each other.

Optionally, in addition to performing image processing to increase the definition of the output image, the terminal may further increase a resolution or the like of the output image to optimize the output image. This is not limited in this embodiment of this application.

According to the photographing method provided in this embodiment of this application, because the first preview picture is collected by the terminal based on the second FOV value, the output image is collected by the terminal based on the third FOV value, and the second FOV value is less than the third FOV value, the definition of the output image is less than the definition of the first preview picture, and the terminal may increase the definition of the output image through definition compensation.

The following describes a method for calculating pixels of a target human face in an embodiment of this application.

Figure 3:
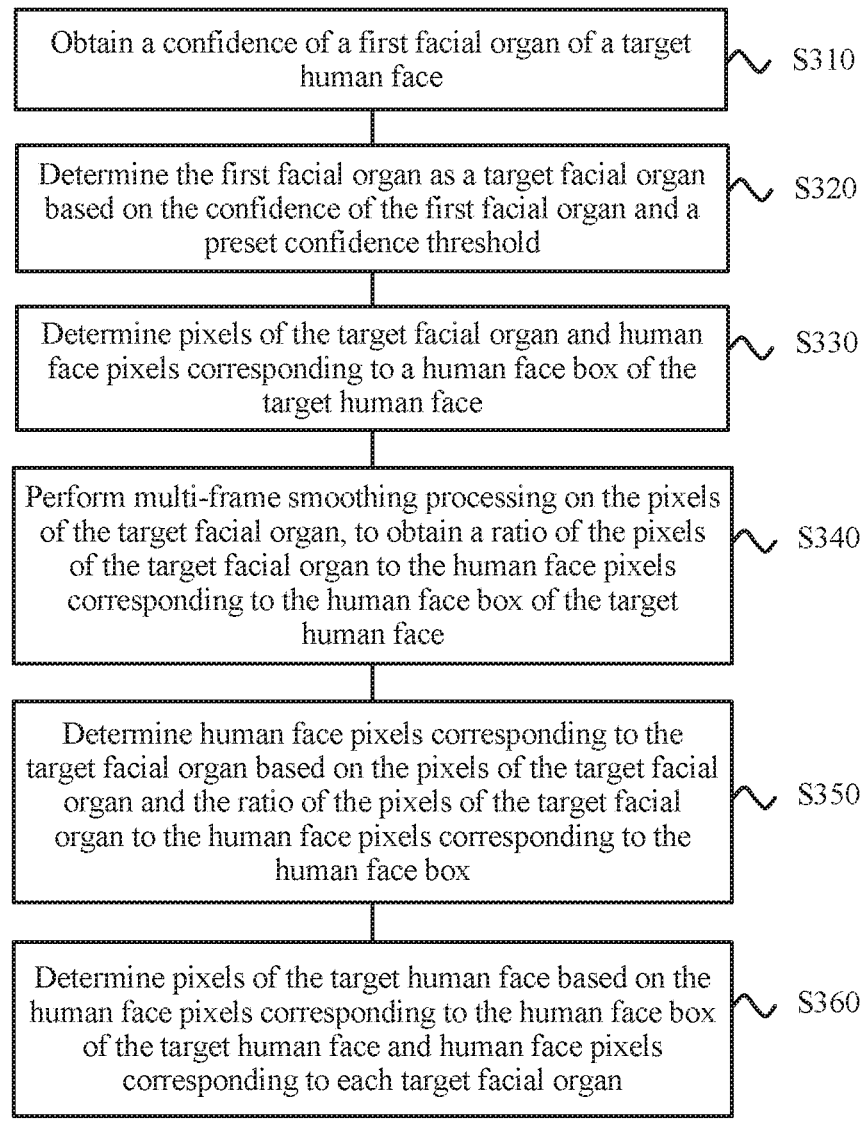
FIG. 3 is a schematic flowchart of a method for determining pixels of a target human face according to an embodiment of this application.

FIG. 3 is a schematic flowchart of a method 300 for calculating pixels of a target human face according to an embodiment of this application. The method 300 may be performed by, for example, a target human face detection engine.

S301: Obtain a confidence of a first facial organ of a target human face, where the first facial organ is at least one of an eye, a nose, and a mouth.

It should be understood that, in a photographing process of a camera, a coordinate point may become an invalid coordinate point due to a jitter or another reason.

Optionally, the target human face detection engine excludes, based on a preset first confidence threshold and a confidence of each of at least one coordinate point corresponding to the first facial organ, a coordinate point whose confidence is less than the first confidence threshold, namely, excludes an invalid coordinate point and retains a valid coordinate point that is relatively reliable, and obtains the confidence of the first facial organ based on the valid coordinate point, thereby improving accuracy of facial organ detection.

S302: Determine the first facial organ as a target facial organ based on the confidence of the first facial organ and a preset confidence threshold.

Optionally, the target human face detection engine may determine the first facial organ as a target facial organ based on the confidence of the first facial organ and a preset second confidence threshold.

In an optional embodiment, it is assumed that there are a plurality of first facial organs, and in this case, the target human face detection engine may use a first facial organ that is in the plurality of first facial organs and whose confidence is greater than the second confidence threshold as a target facial organ.

S303; Determine pixels of the target facial organ and human face pixels corresponding to a human face box of the target human face.

For example, the target human face detection engine may define at least one coordinate point of the human face box by using a Coordinate[N] structure, and determine, based on the at least one coordinate point, the human face pixels $A_1$ corresponding to the human face box. The Coordinate[N] structure may be defined as follows:

```
typedef struct tagFaceCoordinates
{
    unsigned short xTopLeft;
    unsigned short xTopLeft;
    unsigned short xBottomRight;
    unsigned short yBottomRight;
}TFaceCoordinates;
```

It can be learned from the foregoing code that the human face box may be represented by coordinates (xTopLeft, xTopLeft) of a top left point and coordinates (xBottomRight, yBottomRight) of a bottom right point of the human face box. In this embodiment of this application, the human face box may alternatively be represented by another human face box feature point. This embodiment of this application is not limited thereto.

For another example, the target human face detection engine may define at least one coordinate point of the first facial organ by using a FaceInfo structure. The FaceInfo structure may be defined as follows:

```
typedef struct tagFaceInfo
{
    strPoint ptPoint[12];
    int confidence[12];
}TFaceInfo;
```

It can be learned from the foregoing code that the first facial organ includes at least one of a left eye, a right eye, a nose, and a mouth. The left human eye includes an inner corner point, a center point, and an outer corner point, the right human eye includes an inner corner point, a center point, and an outer corner point, the nose includes a left nostril point and a right nostril point, and the mouth includes a left corner point, a right corner point, a center point, and a lip point above the center point. In this embodiment of this application, the eye, the nose, and the mouth may alternatively be represented by other feature points, or the first facial organ may further include another facial organ, for example, may further include an eyebrow or an ear. This embodiment of this application is not limited thereto.

Optionally, it can be learned from the faceInfo structure that each coordinate point has a confidence confidence, 12 coordinate points have 12 confidences in total, confidences of the four facial organs are respectively represented by C_leftEye, C_rightEye, C_nose, and C_mouth, and the confidences of the facial organs are obtained based on confidences of used coordinate points or valid coordinate points.

For example, using pixels of the left eye and the confidence of the left eye as an example, pixels and a confidence of a facial organ may be defined as follows:

```
Define CF_threshold as the valid feature;
//for leftEye
    If C_leftEye_innerPoint >= CF_threshold &&
C_leftEye_outerPoint >=CF_threshold
        S_eye = LensOfTwoPoint(P_leftEye_innerPoint, P_leftEye_outerPoint);
        C_eye = (C_leftEye_innerPoint + C_leftEye_outerPoint) >> 1;
    Else if C_leftEye_innerPoint >= CF_threshold
        If C_leftEye_centerPoint >= CF_threshold
            S_eye = LensOfTwoPoint(P_leftEye_innerPoint, P_leftEye_centerPoint) << 1;
            C_eye = (C_leftEye_innerPoint + C_leftEye_centerPoint) >> 1;
        Else
            S_eye = 0;
            C_eye = 0;
    Else if C_leftEye_outerPoint >=CF_threshold
        If C_leftEye_centerPoint >= CF_threshold
            S_eye = LensOfTwoPoint(P_leftEye_ outerPoint, P_leftEye_centerPoint) << 1;
            C_eye = (C_leftEye_outerPoint + C_leftEye_centerPoint) >> 1;
        Else
            S_eye = 0:
            C_eye = 0;
    Else
        S_eye = 0:
        C_eye = 0;
```

Optionally, the target human face detection engine may calculate the pixels S_leftEye of the left eye and pixels S_rightEye of the right eye, and obtain maximum human eye pixels S_eye based on S_leftEye and S_rightEye. Similarly, the target human face detection engine calculates pixels S_nose of the nose by using at least one coordinate point describing the nose, and calculates pixels S_mouth of the mouth by using at least one coordinate point of the mouth.

In an optional embodiment, it is assumed that confidences of the inner corner point, the outer corner point, and the center point of the left eye are respectively C_leftEye_innerPoint, C_leftEye_outerPoint, and C_leftEye_centerPoint, and coordinates of the inner corner point, the outer corner point, and the center point of the left eye are respectively P_leftEye_innerPoint, P_leftEye_outerPoint, and P_leftEye_centerPoint. If A_eye is calculated by using S_leftEye, C_eye is C_leftEye; otherwise, C_eye is C_rightEye.

Optionally, the target human face detection engine may set a threshold C_threshold, and define an organ whose C_eye, C_nose, or C_mouth is greater than or equal to C_threshold as a target facial organ.

S304: Perform multi-frame smoothing processing on the pixels of the target facial organ, to obtain a ratio of the pixels of the target facial organ to the human face pixels corresponding to the human face box of the target human face.

S305: Determine human face pixels corresponding to the target facial organ based on the pixels of the target facial organ and the ratio of the pixels of the target facial organ to the human face pixels corresponding to the human face box.

In an optional embodiment, the target human face detection engine may respectively estimate ratios R_eye, R_nose, and R_mouth of S_eye, S_nose, and S_mouth of a current frame to $A_1$, and then calculate human face areas A_eye, A_nose, and A_mouth corresponding to the facial organs by using S_eye, S_nose, and S_mouth.

S306: Determine pixels of the target human face based on the human face pixels corresponding to the human face box of the target human face and human face pixels corresponding to each target facial organ.

In an optional embodiment, the target human face detection engine may determine the pixels of the target human face based on $A_1$ and the human face pixels (A_eye, A_nose, and A_mouth) corresponding to the target organs.

Optionally, a terminal may set a threshold R_threshold, respectively calculate ratios RA_eye, RA_nose, and RA_mouth of the human face pixels corresponding to the facial organs to $A_1$, and sum and average pixels of a facial organ whose ratio is within [R_threshold, 1/R_threshold] and the human face pixels $A_1$ corresponding to the human face box, to obtain final pixels of the target human face.

According to the photographing method provided in this embodiment of this application, the final pixels of the target human face are obtained based on pixels of the target human face that are obtained from a plurality of different perspectives, thereby improving detection accuracy of the target human face.

Optionally, the photographing apparatus shown in FIG. 1 may include a plurality of cameras. Optionally, the plurality of cameras may be, for example, disposed in parallel on the photographing apparatus. The plurality of cameras may be front-facing cameras, or the plurality of camera may be rear-facing cameras. This is not limited in this embodiment of this application. In a photographing process, camera switching may be performed depending on different photographing scenes and user requirements.

FIG. 4 shows a photographing method 400 provided in an embodiment of this application. The photographing method is used by a terminal to perform camera switching in a photographing process.

S410: Obtain a first preview picture collected by the first camera or the second camera, where an angle of view of the first camera is a first FOV value, an angle of view of the second camera is a second FOV value, the first FOV value is less than the second FOV value, the first preview picture is collected based on a third FOV value, and the third FOV value is less than the second FOV value.

S420: Adjust the third FOV value to a fourth FOV value when it is detected that a quantity of at least one target human face in the first preview picture is greater than a first preset value, where the fourth FOV value is greater than the third FOV value.

S430: Perform camera switching based on the fourth FOV value.

Optionally, the first FOV value may be a maximum capability value of the first camera, the second FOV value may be a maximum capability value of the second camera, and the first preview picture is collected by the first camera or the second camera based on the third FOV value. This is not limited in this embodiment of this application.

It should be understood that, if the first preview picture is collected by the first camera, a photographable value of the first camera is the third FOV value, if the first preview picture is collected by the second camera, a photographable value of the second camera is the third FOV value, and the FOV of the first camera or the second camera may be adjusted between the photographable value and the maximum value.

Optionally, in S420, when detecting that the first preview picture meets a FOV adjustment condition, the terminal adjusts the FOV, and performs camera switching based on a FOV value calculation result.

Optionally, the terminal may adjust the FOV when the first preview picture meets at least one of the following FOV adjustment conditions: the quantity of the at least one target human face in the first preview picture is greater than the first preset value, or a ratio of pixels of a first target human face in the at least one target human face to pixels of the first preview picture is less than a second preset value. The pixels of the first target human face are greater than pixels of each target human face.

Optionally, in S430, the performing camera switching based on the fourth FOV value may be switching from the first camera to the second camera if the first preview picture is collected by the first camera and the fourth FOV value is greater than the first FOV value; or switching from the second camera to the first camera if the first preview picture is collected by the second camera and the fourth FOV value is less than or equal to the first FOV value.

In an optional embodiment, if the first preview picture is collected by the first camera based on the third FOV value (in other words, the third FOV value is less than the maximum capability value of the first camera), and the fourth FOV value is greater than the first FOV value and less than or equal to the second FOV value, the terminal may photograph based on the maximum capability value of the FOV of the first camera, or switch from the first camera to the second camera, and photograph based on the fourth FOV value of the second camera. When the switched-to second camera is used to photograph, a larger photographing angle of view is used and a photographing effect is better. If the fourth FOV value is greater than the second FOV value, the terminal may switch from the first camera to the second camera, and photograph based on the maximum capability value of the FOV of the second camera.

In another optional embodiment, if the first preview picture is collected by the second camera based on the third FOV value (in other words, the third FOV value is less than the maximum capability value of the second camera), and the fourth FOV value is less than or equal to the first FOV value, the terminal may use the first camera or the second camera to photograph. When the switched-to first camera is used to photograph, a picture has a higher definition. Optionally, if the fourth FOV value is greater than the second FOV value, the terminal may photograph based on the maximum capability value of the FOV of the second camera.

For example, it is assumed that the maximum FOV value of the first camera is 60 degrees, the maximum FOV value of the second camera is 100 degrees, the first camera having a small angle of view is a primary camera, and the second camera having a large angle of view is a secondary camera. In this case, the terminal first uses the primary camera to photograph when started. If the first preview picture that is collected by the first camera at a 45-degree FOV meets a FOV adjustment condition, and it is determined, based on image information of the first preview picture, to adjust the photographing angle of view from 45 degrees to 60 degrees, the terminal may still use the first camera to photograph, or may switch from the first camera to the second camera. The second camera photographs at a 60-degree FOV. If it is determined to adjust the photographing angle of view from 45 degrees to 90 degrees, the terminal needs to switch from the currently used first camera to the second camera, and use the second camera to photograph at a 90-degree FOV. If it is determined to adjust the photographing angle of view from 45 degrees to 110 degrees, because the capability value of the second camera having a large angle of view is 100 degrees, the terminal may switch from the first camera to the second camera, and photograph based on the maximum capability value, namely, 100 degrees, of the FOV of the second camera.

For another example, it is assumed that the maximum FOV value of the first camera is 60 degrees, the maximum FOV value of the second camera is 100 degrees, the second camera having a large angle of view is a primary camera, and the first camera having a small angle of view is a secondary camera. In this case, the terminal first uses the primary camera to photograph when started. If the first preview picture that is collected by the second camera at an 85-degree FOV meets a FOV adjustment condition, and it is determined, based on image information of the first preview picture, to adjust the photographing angle of view from 85 degrees to 95 degrees, the terminal photographs based on the maximum capability value, namely, 100 degrees, of the FOV of the second camera. If the first preview picture that is collected by the second camera at a 45-degree FOV meets a FOV adjustment condition, and it is determined, based on image information of the first preview picture, to adjust the photographing angle of view from 45 degrees to 55 degrees, the terminal may still use the second camera to photograph, or may switch from the second camera to the first camera. The first camera photographs at a 55-degree FOV.

According to the camera switching method provided in this embodiment of this application, when it is detected that the first preview picture meets a FOV adjustment condition, camera switching may be automatically performed, to improve a photographing effect of the terminal.

It should be understood that a method for calculating the fourth FOV value in this embodiment of this application is similar to the method in FIG. 2, and to avoid repetition, details are not described herein again.

The foregoing describes, with reference to FIG. 1 to FIG. 4, the photographing method and the camera switching method provided in the embodiments of this application, and the following describes, with reference to FIG. 5 to FIG. 8, photographing apparatuses provided in the embodiments of this application.

FIG. 5 is a schematic block diagram of a photographing apparatus 500 according to an embodiment of this application. The photographing apparatus 500 includes:

an obtaining unit 510, configured to obtain a first preview picture collected by a camera, where an angle of view FOV of the camera is a first FOV value, the camera collects the first preview picture based on a second FOV value, and the second FOV value is less than the first FOV value;

an adjustment unit 520, configured to adjust the second FOV value to a third FOV value when it is detected that a quantity of at least one target human face in the first preview picture obtained by the obtaining unit 510 is greater than a first preset value, where the third FOV value is greater than the second FOV value, and the third FOV value is less than or equal to the first FOV value; and an output unit 530, configured to output an image that is photographed by the camera based on the third FOV value adjusted by the adjustment unit.

Optionally, the adjustment unit is specifically configured to adjust the second FOV value to the third FOV value when it is detected that the quantity of the at least one target human face in the first preview picture is greater than the first preset value, and a ratio of pixels of a first target human face in the at least one target human face to pixels of the first preview picture is less than a second preset value, where the pixels of the first target human face are greater than pixels of each target human face.

Optionally, the adjustment unit is further configured to: before adjusting the second FOV value to the third FOV value when it is detected that the quantity of the at least one target human face in the first preview picture is greater than the first preset value, obtain image information of the first preview picture, where the image information includes at least one piece of the following information: the quantity of the at least one target human face, the pixels of each target human face, a location of each target human face, a distortion parameter of the camera during collection of the first preview picture, a focal length of the camera during collection of the first preview picture, and a distance between the camera and a to-be-photographed object during collection of the first preview picture; and determine the third FOV value based on the image information.

Optionally, the adjustment unit is specifically configured to: determine, based on the distortion parameter of the camera and a first resolution of the first preview picture, a picture loss of each of P pixels included in the first preview picture at the first resolution, where the first resolution is corresponding to the second FOV value; determine Q pixels that are in the P pixels and whose picture losses are less than a preset picture loss threshold as a second resolution, where Q is less than or equal to P, and the second resolution is less than or equal to the first resolution; and determine the third FOV value based on the first resolution, the second resolution, and the second FOV value.

Optionally, the adjustment unit is specifically configured to determine the third FOV value $f_{3\_code}$ of the camera based on the foregoing formula (1).

Optionally, the adjustment unit is specifically configured to determine the third FOV value $f_{3\_dis}$ of the camera based on the foregoing formula (2).

Optionally, the image information includes N pieces of information, where N is greater than or equal to 1, and the adjustment unit is specifically configured to: determine M FOV values based on M of the N pieces of information, where the M pieces of information are in one-to-one correspondence with the M FOV values, and M is less than or equal to N; and determine a largest value in the M FOV values as the third FOV value.

Optionally, the adjustment unit is further configured to: before adjusting the second FOV value to the third FOV value when it is detected that the quantity of the at least one target human face in the first preview picture is greater than the first preset value, detect human face information of the first preview picture, where the human face information includes at least one piece of the following information: a quantity of at least one human face, pixels of each human face, a location of each human face, or a turning angle of each human face; and determine the quantity of the at least one target human face based on the human face information.

Optionally, the adjustment unit is further configured to: before adjusting the second FOV value to the third FOV value when it is detected that the quantity of the at least one target human face in the first preview picture is greater than the first preset value, and the ratio of the pixels of the first target human face in the at least one target human face to the pixels of the first preview picture is less than the second preset value, determine human face pixels corresponding to a human face box of each target human face and human face pixels corresponding to each of at least one target facial organ included in each target human face, where the target facial organ is an eye, a nose, or a mouth; and determine the pixels of each target human face based on the human face pixels corresponding to the human face box of each target human face and the human face pixels corresponding to each of the at least one target facial organ.

Optionally, the adjustment unit is specifically configured to: determine pixels of a first target facial organ in the at least one target facial organ; perform multi-frame smoothing processing on the pixels of the first target facial organ, to obtain a ratio of the pixels of the first target facial organ to the human face pixels corresponding to the human face box in the first preview picture; and determine human face pixels corresponding to the first target facial organ based on the pixels of the first target facial organ and the ratio of the pixels of the first target facial organ to the human face pixels corresponding to the human face box.

Optionally, the adjustment unit is further configured to: before determining the human face pixels corresponding to the human face box of each target human face and the human face pixels corresponding to each of the at least one target facial organ included in each target human face, obtain a confidence of a first facial organ, where the first facial organ is an eye, a nose, or a mouth; and determine the first facial organ as the target facial organ based on the confidence of the first facial organ and a preset confidence threshold.

Optionally, a definition of the first preview picture is higher than a definition of the image, the photographing apparatus further includes a processing unit, and the processing unit is configured to: before the image that is photographed by the camera based on the third FOV value is output, crop the first preview picture at a first rate, to obtain an edge picture of the first preview picture; and perform definition compensation processing on the image based on the edge picture, to obtain the processed image.

In an optional example, a person skilled in the art may understand that the photographing apparatus 500 may be specifically the terminal in the foregoing method embodiments, and the photographing apparatus 500 may be configured to perform processes and/or steps that are in the foregoing method embodiments and that correspond to the data sending device. To avoid repetition, details are not described herein again.

It should be understood that the photographing apparatus 500 herein may be embodied in a form of a functional unit. The term "unit" herein may be an application-specific integrated circuit (application-specific integrated circuit, ASIC), an electronic circuit, a processor (for example, a shared processor, a dedicated processor, or a group processor) configured to execute one or more software or firmware programs and a memory, a merged logic circuit, and/or another appropriate component that supports the described functions.

Figure 6:
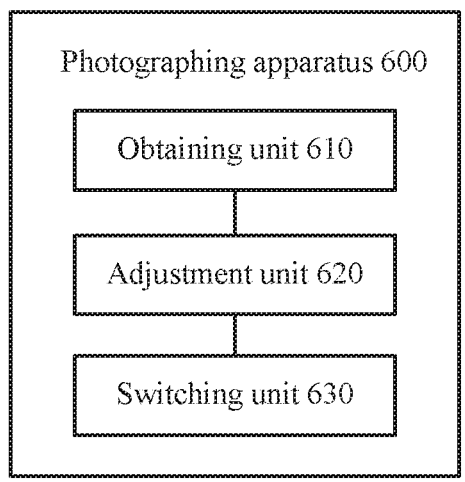
FIG. 6 is a schematic block diagram of another photographing apparatus according to an embodiment of this application.

FIG. 6 is a schematic block diagram of another photographing apparatus 600 according to an embodiment of this application. A terminal includes a first camera and a second camera, the first camera and the second camera are disposed in parallel on a body of the terminal, and the photographing apparatus includes:

an obtaining unit 610, configured to obtain a first preview picture collected by the first camera or the second camera, where an angle of view of the first camera is a first FOV value, an angle of view of the second camera is a second FOV value, the first FOV value is less than the second FOV value, the first preview picture is collected based on a third FOV value, and the third FOV value is less than the second FOV value;

an adjustment unit 620, configured to adjust the third FOV value to a fourth FOV value when it is detected that a quantity of at least one target human face in the first preview picture obtained by the obtaining unit 610 is greater than a first preset value, where the fourth FOV value is greater than the third FOV value; and a switching unit 630, configured to perform camera switching based on the fourth FOV value adjusted by the adjustment unit 620.

Optionally, the switching unit is specifically configured to switch from the first camera to the second camera if the first preview picture is collected by the first camera and the fourth FOV value is greater than the first FOV value; or switch from the second camera to the first camera if the first preview picture is collected by the second camera and the fourth FOV value is less than or equal to the first FOV value.

Optionally, the adjustment unit is specifically configured to adjust the third FOV value to the fourth FOV value when it is detected that the quantity of the at least one target human face in the first preview picture is greater than the first preset value, and a ratio of pixels of a first target human face in the at least one target human face to pixels of the first preview picture is less than a second preset value, where the pixels of the first target human face are greater than pixels of each target human face.

Optionally, the adjustment unit is further configured to: before adjusting the third FOV value to the fourth FOV value when it is detected that the quantity of the at least one target human face in the first preview picture is greater than the first preset value, obtain image information of the first preview picture, where the image information includes at least one piece of the following information: the quantity of the at least one target human face, the pixels of each target human face, a location of each target human face, a distortion parameter of the camera collecting the first preview picture, a focal length of the camera collecting the first preview picture, and a distance between the camera collecting the first preview picture and a to-be-photographed object; and determine the fourth FOV value based on the image information.

In an optional example, a person skilled in the art may understand that the photographing apparatus 600 may be specifically the terminal in the foregoing method embodiments, and the photographing apparatus 600 may be configured to perform processes and/or steps that are in the foregoing method embodiments and that correspond to the data sending device. To avoid repetition, details are not described herein again.

It should be understood that the photographing apparatus 600 herein may be embodied in a form of a functional unit. The term "unit" herein may be an ASIC, an electronic circuit, a processor (for example, a shared processor, a dedicated processor, or a group processor) configured to execute one or more software or firmware programs and a memory, a merged logic circuit, and/or another appropriate component that supports the described functions.

Figure 7:
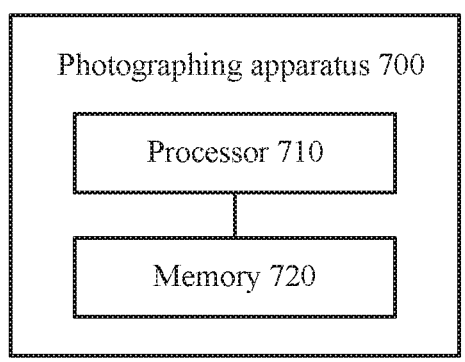
FIG. 7 is a schematic block diagram of still another photographing apparatus according to an embodiment of this application.

FIG. 7 is a schematic block diagram of still another photographing apparatus 700 according to an embodiment of this application. The photographing apparatus 700 includes a processor 710 and a memory 720.

The processor 710 is specifically configured to:

obtain a first preview picture collected by a camera, where an angle of view FOV of the camera is a first FOV value, the camera collects the first preview picture based on a second FOV value, and the second FOV value is less than the first FOV value;

adjust the second FOV value to a third FOV value when it is detected that a quantity of at least one target human face in the first preview picture is greater than a first preset value, where the third FOV value is greater than the second FOV value, and the third FOV value is less than or equal to the first FOV value; and output an image that is photographed by the camera based on the third FOV value.

Optionally, the memory may include a read-only memory and a random access memory, and provide an instruction and data for the processor. A part of the memory may further include a non-volatile random access memory. For example, the memory may further store device type information. The processor 710 may be configured to execute the instruction stored in the memory, and when the processor executes the instruction, the processor may perform steps that are in the foregoing method embodiments and that correspond to the photographing method.

In an optional example, a person skilled in the art may understand that the photographing apparatus 700 may be specifically the terminal in the foregoing embodiment 200, 300, or 400, and the photographing apparatus 700 may be configured to perform processes and/or steps that are in the foregoing method embodiment 200, 300, or 400 and that correspond to the terminal. To avoid repetition, details are not described herein again.

It should be understood that, in this embodiment of this application, the processor may be a central processing unit (English: central processing unit, CPU for short), or the processor may be another general-purpose processor, a digital signal processor (English: digital signal processing, DSP for short), an application-specific integrated circuit ASIC, a field programmable gate array (English: field programmable gate array, FPGA for short) or another programmable logic device, a discrete gate or a transistor logic device, a discrete hardware component, or the like. The general-purpose processor may be a microprocessor, or the processor may be any conventional processor or the like.

In an implementation process, steps in the foregoing methods may be implemented by using an integrated logical circuit of hardware in the processor, or by using instructions in a form of software. The steps of the methods disclosed with reference to the embodiments of this application may be directly performed by a hardware processor, or may be performed by using a combination of hardware in the processor and a software module. The software module may be located in a mature storage medium in the art, for example, a random access memory, a flash memory, a read-only memory, a programmable read-only memory, an electrically erasable programmable memory, or a register. The storage medium is located in the memory, and the processor executes the instruction in the memory and completes the steps in the foregoing methods in combination with hardware of the processor. To avoid repetition, details are not described herein again.

Figure 8:
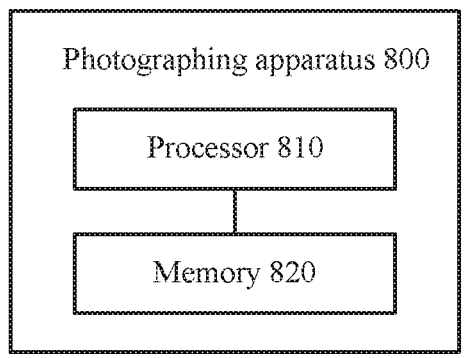
FIG. 8 is a schematic block diagram of still another photographing apparatus according to an embodiment of this application.

FIG. 8 is a schematic block diagram of still another photographing apparatus 800 according to an embodiment of this application. The photographing apparatus 800 includes a processor 810 and a memory 820.

The processor 810 is specifically configured to:

obtain a first preview picture collected by a first camera or a second camera, where an angle of view of the first camera is a first FOV value, an angle of view of the second camera is a second FOV value, the first FOV value is less than the second FOV value, the first preview picture is collected based on a third FOV value, and the third FOV value is less than the second FOV value;

adjust the third FOV value to a fourth FOV value when it is detected that a quantity of at least one target human face in the first preview picture is greater than a first preset value, where the fourth FOV value is greater than the third FOV value; and perform camera switching based on the fourth FOV value.

Optionally, the memory may include a read-only memory and a random access memory, and provide an instruction and data for the processor. A part of the memory may further include a non-volatile random access memory. For example, the memory may further store device type information. The processor 810 may be configured to execute the instruction stored in the memory, and when the processor executes the instruction, the processor may perform steps that are in the foregoing method embodiments and that correspond to the photographing method.

In an optional example, a person skilled in the art may understand that the photographing apparatus 800 may be specifically the terminal in the foregoing embodiment 200, 300, or 400, and the photographing apparatus 800 may be configured to perform processes and/or steps that are in the foregoing method embodiment 200, 300, or 400 and that correspond to the terminal. To avoid repetition, details are not described herein again.

It should be understood that, in this embodiment of this application, the processor may be a central processing unit (CPU), or the processor may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

In an implementation process, steps in the foregoing methods may be implemented by using an integrated logical circuit of hardware in the processor, or by using instructions in a form of software. The steps of the methods disclosed with reference to the embodiments of this application may be directly performed by a hardware processor, or may be per formed by using a combination of hardware in the processor and a software module. The software module may be located in a mature storage medium in the art, for example, a random access memory, a flash memory, a read-only memory, a programmable read-only memory, an electrically erasable programmable memory, or a register. The storage medium is located in the memory, and the processor executes the instruction in the memory and completes the steps in the foregoing methods in combination with hardware of the processor. To avoid repetition, details are not described herein again.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of this application. The storage medium includes: various media that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, and are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An electronic device, comprising:
   a processor;
   a first front-facing camera coupled to the processor and disposed on a screen side of the electronic device;
   a second front-facing camera coupled to the processor and disposed on the screen side of the electronic device; and
   a memory coupled to the processor and storing instructions that, when executed by the processor, cause the electronic device to be configured to:
      collect, by the first front-facing camera, a first preview picture showing a first quantity of human faces;
      display the first preview picture;
      calculate a first ratio of the first quantity of human faces to a first quantity of pixels from the first preview picture;
      collect, by the second front-facing camera, a second preview picture;
      display the second preview picture; and
      automatically switch to displaying the second preview picture when the first ratio is greater than a preset value, wherein a first field of view (FOV) value of the first front-facing camera is less than a second FOV value of the second front-facing camera, and wherein a second ratio of the first quantity of human faces to a second quantity of pixels from the second preview picture is less than the first ratio.

2. The electronic device of claim 1, wherein the instructions further cause the electronic device to be configured to increase the first FOV value to a third FOV value in response to the first picture meeting an adjustment condition.

3. The electronic device of claim 2, wherein the instructions further cause the electronic device to acquire a distortion parameter of the second front-facing camera.

4. The electronic device of claim 3, wherein the instructions further cause the electronic device to be configured to crop the second preview picture to remove pixels with distortion according to the distortion parameter.

5. The electronic device of claim 1, wherein the instructions further cause the electronic device to be configured to calculate the first ratio by causing the electronic device to be configured to:
   acquire a third quantity of pixels of the first quantity of human faces;
   acquire the first quantity of pixels of the first preview picture; and
   calculate the first ratio based on the first quantity of pixels and the third quantity of pixels.

6. The electronic device of claim 1, wherein the instructions further cause the electronic device to be configured to acquire a third quantity of pixels of the first quantity of human faces by:
   determining one or more face boxes for the first quantity of human faces; and
   calculating a sum of pixels in the one or more face boxes.

7. The electronic device of claim 6, wherein the instructions further cause the electronic device to be configured to perform multi-frame smoothing on the pixels in the one or more face boxes after the one or more face boxes are determined.

8. A photographing method implemented by an electronic device, wherein the method comprises:
   collecting a first preview picture from a first front-facing camera disposed on a screen side of the electronic device;
   displaying the first preview picture, wherein the first preview picture comprises a first quantity of human faces;
   calculating a first ratio of the first quantity of human faces to a first quantity of pixels from the first preview picture;
   determining that the first ratio is greater than a preset value;
   collecting a second preview picture from a second front-facing camera disposed on the screen side of the electronic device;
   displaying the second preview picture; and
   automatically switching to display the second preview picture in response to the first ratio being greater than the preset value, wherein a first field of view (FOV) value of the first front-facing camera is less than a second FOV value of the second front-facing camera, and wherein a second ratio of the first quantity of human faces to a second quantity of pixels from the second preview picture is less than the first ratio.

9. The method of claim 8, further comprising increasing the first FOV value to a third FOV value in response to the first preview picture meeting an adjustment condition.

10. The method of claim 9, further comprising acquiring a distortion parameter of the second front-facing camera.

11. The method of claim 10, wherein the method further comprises cropping the second preview picture to remove distorted pixels according to the distortion parameter.

12. The method of claim 8, wherein calculating the first ratio comprises:
    acquiring a third quantity of pixels from the first quantity of human faces;
    acquiring the first quantity of pixels from the first preview picture; and
    calculating the first ratio based on the first quantity of pixels and the third quantity of pixels.

13. The method of claim 12, wherein acquiring the third quantity of pixels comprises:
    determining one or more face boxes for the first quantity of human faces; and
    calculating a sum of pixels in the one or more face boxes.

14. The method of claim 13, wherein the method further comprises performing multi-frame smoothing processing on the pixels in the one or more face boxes.

15. A non-transitory computer-readable medium storing computer usable instructions that, when executed by a processor, cause a device comprising the processor to be configured to:
    collect a first preview picture from a first front-facing camera disposed on a screen side of the device, wherein the first preview picture comprises a first quantity of human faces;
    display the first preview picture;
    calculate a first ratio of the first quantity of human faces to a first quantity of pixels from the first preview picture;
    determine that the first ratio is greater than a preset value;
    collect a second preview picture from a second front-facing camera disposed on the screen side of the device; and
    automatically switch to display the second preview picture in response to the first ratio being greater than the preset value, wherein a first field of view (FOV) value of the first front-facing camera is less than a second FOV value of the second front-facing camera, and wherein a second ratio of the first quantity of human faces to a second quantity of pixels from the second preview picture is less than the first ratio.

16. The computer usable instructions of claim 15, wherein the instructions further cause the device to be configured to increase the first FOV value to a third FOV value in response to the first preview picture meeting an adjustment condition.

17. The computer usable instructions of claim 16, wherein the instructions further cause the device to be configured to acquire a distortion parameter of the second front-facing camera.

18. The computer usable instructions of claim 17, wherein the instructions further cause the device to be configured to crop the second preview picture to remove pixels with distortion according to the distortion parameter.

19. The computer usable instructions of claim 15, wherein the calculation of the first ratio further comprises:
    acquire a third quantity of pixels of the first quantity of human faces;
    acquire the first quantity of pixels of the first preview picture; and
    calculate the first ratio based on the first quantity of pixels and the third quantity of pixels.

20. The computer usable instructions of claim 19, wherein the instructions cause the processor to be configured to determine the third quantity by causing the device to be configured to:
    determine one or more face boxes for each of the first quantity of human faces; and
    calculate a sum of pixels in the one or more face boxes.

* * * * *